(No Model.)  2 Sheets—Sheet 1.
I. L. PULVERMACHER.
VOLTAIC BATTERY AND APPARATUS FOR MEDICAL PURPOSES.
No. 9,571. Patented Feb. 1, 1853.
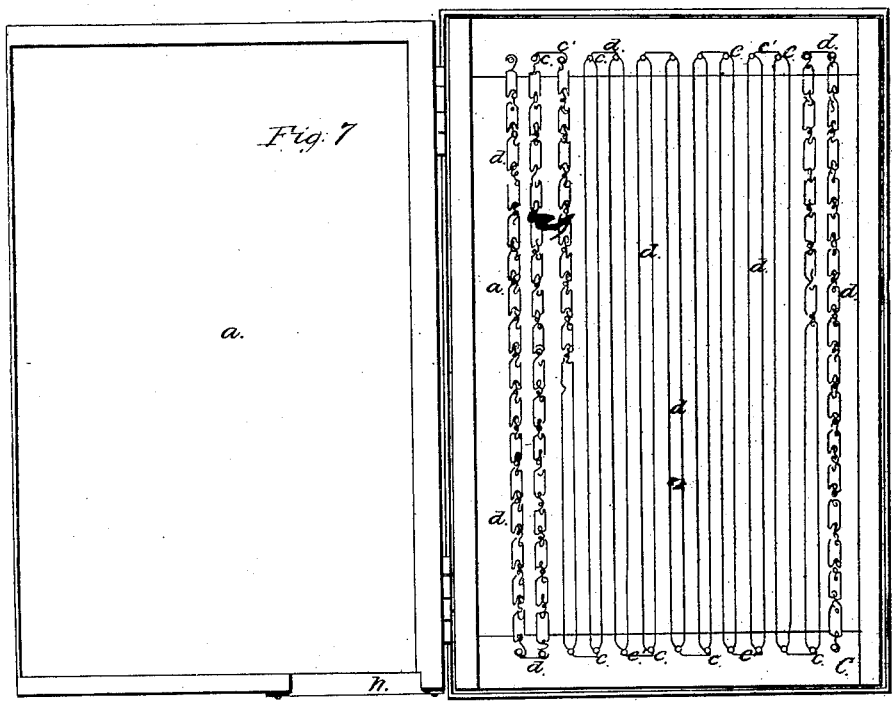
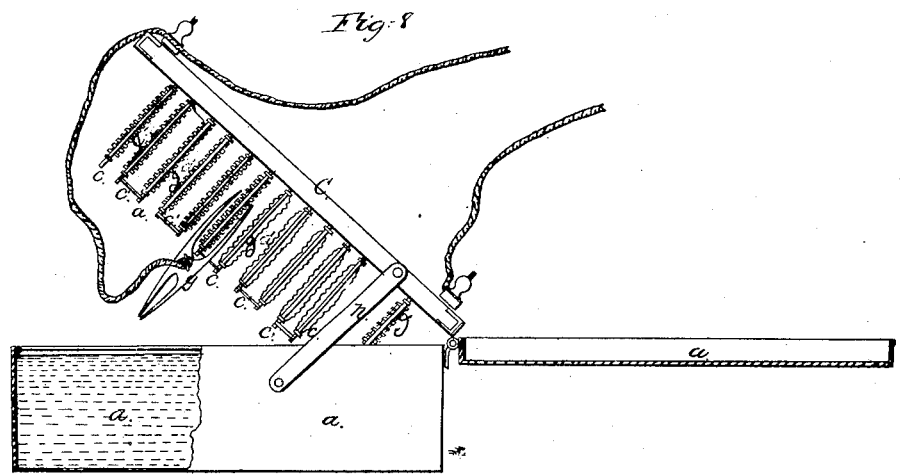
Witnesses.
Inventor:
J. L. Pulvermacher

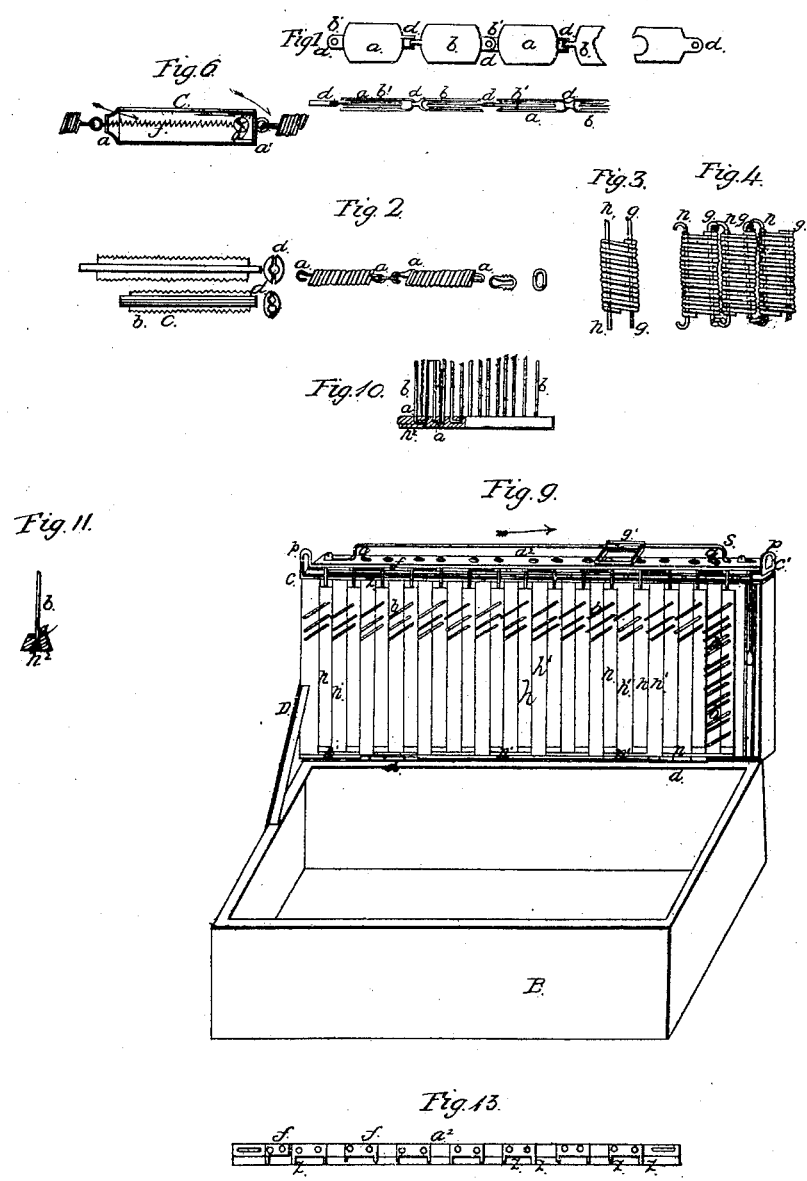

UNITED STATES PATENT OFFICE.

I. L. PULVERMACHER, OF BRESLAU, PRUSSIA.

IMPROVEMENT IN VOLTAIC BATTERIES AND APPARATUS FOR MEDICAL AND OTHER PURPOSES.

Specification forming part of Letters Patent No. 9,571, dated February 1, 1853.

*To all whom it may concern:*

Be it known that I, ISAAC LEWIS PULVERMACHER, of Breslau, in the Kingdom of Prussia, have invented certain new and useful improvements in hydro-electric voltaic batteries and chains for medical purposes, and in the method of interrupting the current for medical and other purposes; and I do hereby declare that the following is a full, clear, and exact description thereof, reference being had to the accompanying drawings, making part of this specification, in which—

Figure 1 represents different views of a chain of plate-formed electro-motors. Fig. 2 represents the mode I prefer of forming the elements and of uniting them into a chain. Figs. 3 and 4 represent a mode of uniting the elements into a chain of but little length. Fig. 6 is a representation of a portable brake or current-interrupter. Fig. 7 is a plan, and Fig. 8, an elevation, of a Mignon battery. Fig. 9 is a perspective view of a modification of the Mignon battery; and Figs. 10, 11, 12, and 13 details thereof in section.

The nature of my invention consists in forming galvanic elements of a positive and negative metal separated from each other and combined and in contact with a porous non-conducting substance, which porous substance will absorb and retain the exciting-fluid and impart it to the metals to excite the electric action; and my invention also consists in forming such elements by coiling in the form of helices the positive and negative wires in grooves previously made on a block or blocks of wood or other porous substance, so that when the wires are wrapped around in the said grooves they shall be kept from contact with each other, the space between the two coils being sufficient for the passage of the exciting-liquid to the wood or other porous substance constituting the core; and my invention also consists in forming a chain by linking together a series of such elements composed of positive and negative metals with a porous non-conducting substance interposed and one or both the metals surrounding the said non-conducting and porous substance, so that I am thus enabled to constitute a chain consisting of a series of elements each constituted of a negative and positive metal separated from each other and both in contact with a porous substance, which will absorb and retain the required liquid to excite an electric current, and which can be applied to any part of the human body for medical purposes; and, finally, my invention relates to mechanical interrupters of the current of electricity for medical purposes, to be employed in connection with my improved chains, so that the interruption shall be effected by the mechanical motion of the body.

Figure 1 represents a chain composed of a series of elements linked together, each one of which is an electric pile.

The links *a* are flat tubes of positive metal, with a flat plate of negative metal, *b'*, inside, and with a porous non-conducting substance, such as linen cloth, leather, or wood, interposed; and the links *b* are formed in the same manner, but reversed, with the negative metal outside and the positive inside. The links thus formed constitute elements which are then linked together to form a chain by metallic links *d*, which unite the positive metal of one element with the negative metal of the next.

Care should be observed to effectually interpose the porous non-conducting substance. This arrangement, however, presents certain difficulties, viz: first, that after the zinc plates are consumed the chain is entirely disjointed; second, that it does not present sufficient surface for producing an electric current of requisite strength in a small space and with fluids of but little exciting force, such as water, for instance; third, that in being brought simply in contact with the human body it does not produce electric currents; fourth, that it is very difficult to expel the zinc oxide from the porous non-conducting material interposed between the two electro-motor plates; fifth, that it is not easily manufactured on a large scale.

In the following combinations the above-mentioned difficulties are avoided.

Fig. 2 represents a hydro-electric chain-battery offering such a sensibility as to become evidently electric by simply being put in contact with the surface of the human body, and to produce, when moistened with any diluted acid, the known physical, chemical, and physiological effects of a powerful portable pile on a small scale.

The element is composed of zinc and copper wire coiled as a helix around a core formed of small pieces of wood, and copper wire, or other conducting-wire, inserted in a hole inside. The zinc wire for the negative element has one of its ends soldered to the copper or other conducting wire inside, and the copper wire of the positive element is in like manner connected with the inside wire or conductor, and the inside conducting-wires are then formed with hooks and linked together to form the chain.

In order to manufacture the cores with great facility I take two half-cylinders or ovals of wood, $d$, the outer periphery of which is formed with helical furrows $b\ c$, and the zinc and copper wires are wound around them, forming helical coils, taking care not to establish a contact between the two coils. The coiling may be executed by means of a machine such as is used for coiling wire around the bass-strings of instruments. The cores covered in this manner are now divided into pieces of sufficient length, into which the hooks or eyes $a\ a$ are inserted and firmly pressed. After having attached to each other a sufficient number of such elements or links, and having moistened them with any diluted acid, salt solution, or common vinegar, the poles or ends of this chain will prove a current of a strong electric tension, the intensity of which will increase proportionally to the number of links and be able to overcome important resistances.

In circumstances where chain-batteries of but small length are wished for, without lessening the number of links, I attach these links to each other in the following manner: Fig. 3, $h$ and $g$, are conducting-wires passed through longitudinal grooves made in the two wooden cores, forming two holes when put together, the ends of which wires are bent into small rings or eyes to unite the series of elements into a chain with the elements parallel. On one side the two ends of the copper wire are attached to $g$, and on the other side the two ends of the zinc wire are attached to $h$, and then the chain is formed by hooking together $g$ of one element with $h$ of the other, as shown in Fig. 4, in such manner that the eyes to which the ends of the zinc wires are attached are hooked into the eyes to which are fastened the ends of the copper wires.

I will now describe the construction and arrangement of a portable break or current-interrupter for obtaining rapid interruptions of the electric current by means of the movements of the human body.

In Fig. 6, C is a small cylinder, of glass or other insulating substance, on the outside of a metallic or conducting cylinder, C'. A and A' are metallic caps cemented firmly, one to the end of the glass or insulating cylinder C, and the other to metal cylinder C', the cylinder thus made in two parts and fitting one within the other to give access to the inside for cleaning.

$f$ is a helical spring soldered to one of the caps A, and $d$ is a small piece of metal, of any desired form, soldered to the free end of the helical spring. At every movement that is imparted to this apparatus the helical spring will vibrate, and thereby cause the piece of metal $d$ to come in contact with the inner surface of the metal cylinder, which is in connection with the cap A' at the opposite end from the spring, thereby establishing the conducting contact between the two caps. The poles of the hydro-electric chain-battery are inserted into the hooks soldered at each end to the caps.

If desired, the cylinder can be made of glass, gutta-percha, or other non-conducting substance and the spring attached to the hook at one end and a metallic substance extending from the other hook for the metal head to strike against during the vibrations.

The Mignon battery is composed of a box, $a$, Figs. 7 and 8, of tin-plate, covered on the inner and outer surfaces with any non-conducting substance—such as sheets of india-rubber or gutta-percha—the upper flanges or brims of which box are bent round inward, the corners being properly soldered or otherwise secured in order to prevent the escape of the fluid that might gather into the box after this has been emptied.

C is a frame made of any convenient insulating substance—such as bone, &c.—attached to the box by means of hinges. In each of the lateral sides of the frame C are inserted in a perpendicular position gilded metallic pins $c\ c$ $c\ c$, for supporting the parts of the chain. The chains of elements $d$ are slipped onto these pins and there secured in any appropriate manner, while the elasticity of the pins will keep the chains sufficiently stretched, the latter being fixed on the pins $c$ in such manner that the positive wire of each row is connected to the negative wire of the following row by connecting-wires $c'$, as shown.

For putting the apparatus into operation a sufficient quantity of exciting-fluid—such as vinegar or other acid—is put into the box in order to moisten the battery when this is lowered into the fluid. The battery is then lifted out of the liquid and maintained by the stay $h$ in the position represented.

For the purpose of applying the apparatus one of the wires must be connected in any well-known manner with one pole of the battery, and the other wire is attached to a pair of pinchers or metal fork, $g$, which is made to grasp any one of the chains of elements in the series, so that the force of the current will depend upon the number interposed between the two wires. I act in the same manner with my other combinations of mignon batteries, which I will describe hereinafter.

In another construction of Mignon batteries I take the elements as already described for forming chains and bore two holes in the wooden blocks of each, and longitudinally.

The arrangement of this Mignon battery is as follows: $h$ represents small dovetailed bars, of wood or any other convenient insulating substance, adapted to slide between the permanent bars $h'$. In the middle of the under part of each of these bars is made a furrow in the entire length of the bar, in which furrow is drilled a certain number of holes, $a$, Figs. 10 and 11, in which are firmly inserted the cramps $b$ of gilded non-annealed copper wire bent in the middle to form each two pins, so that they all project into the groove and extend above the bar to a sufficient length to receive the elements, which are fixed on these protruding pins in such manner as to have always one arm of one double pin inserted into one of the two holes of an element, and the arm of the adjoining one inserted into the other hole of the same element, as shown at Fig. 10. The ends of these pins are connected with the ends of the wires of the elements in such manner as to have the positive-wire end of an element attached to one pin and the negative-wire end of the adjoining element attached to the other pin, by which contrivance the several elements of the entire apparatus are united according to the principle of the voltaic pile.

B is a box constructed in the same manner as that described in Figs. 7 and 8.

D is a lid, of wood or any other convenient insulating substance, attached to the box by means of hinges $d\,d$, for opening and shutting the box. In this lid are grooves to receive the the bars $h$ and permit them to slide therein.

$n'\,n'$ are hammered pieces of sheet-copper, which are gilded and attached to the hinder side of the lid, and serve, by coming in contact with the wires on the ends of the dovetail-bars, as seen at $h^2$, to establish the communication between the final element of the first bar and the final element of the second bar, and between the third and fourth, and so on throughout the series. This establishes the connection at one end, and the connection at the other end can be formed or broken by the following contrivance in such manner as to produce either an action of quantity or of intensity of the current: $c\,c'$ are two metal rails, between which a strip of horn or other insulating substance is inserted, the whole being riveted together; (one of the plates of metal is represented at Fig. 12;) and beyond these there is a plate of horn, $a^2$, (shown separately at Fig. 13,) and to the latter are attached metal pieces $f\,f$, and between the metal pieces $f\,f$ and the metal plate $c'$ an insulator is interposed. The metal pieces $f\,f$ and the rails $c\,c'$ have teeth $z\,z$. The metal plates $c\,c'$ have elongated mortises or slots, through which the fastenings pass in such manner as to admit of pushing them forward and backward and retaining them in any desired position. $o\,o$ are copper springs embedded in the grooves in which the bars $h$ slide, so as to be brought in conducting contact, by touching the bottom of the last cramp $b$, with the two final ends of the electro-motor ends of each bar $h$. The teeth $z\,z$, as well as the ends $o\,o$, of these springs are placed in such position that by pushing the rails in the direction of the arrow the teeth $z\,z$ of the metal pieces $f\,f$ come in conducting contact with these springs $o\,o$, and these, being in contact with the last of the cramps $b$, establish the voltaic circuit, in the same manner as has taken place on the hinder side of the lid by the plates $n'\,n'$, forming thereby a continuous electric circuit.

It has been shown that when the rails are pushed in the direction of the arrow all the bars $h$ are connected together in pairs at one end by the plates $n'$, and the last of the first pair with the first of the second pair, and so on throughout the series, by the metal plates $f\,f$ to produce a current of intensity; but if volume without intensity is required, then the rails must be pushed in the opposite direction, which separates the plates $f\,f$ from the springs $o\,o$, and the teeth $z\,z$ of the rails $c\,c'$ will be brought in contact with them, and as each rail has only half the number of teeth $z\,z$, it follows that the rail $c$ will be brought in connection with every alternate spring $o$ and bar $h$, while the intermediate ones will be connected with the rail $c'$, thus constituting the two hooked ends $p\,p$ of the rails the opposite poles of the battery, and thus connecting all the zinc or negative wires of the elements with one rail, and all the copper or positive wires of the elements with the other rail, the two rails being insulated, as before stated, and the bars $h$ connected in pairs at the other end by the plates $n'$ to establish the electric contact.

For regulating the current a metal rod, $s$, is attached to the horn-plate $a^2$, and to this rod is adapted a metal slide, $g'$, which can at pleasure be moved along the rod, so as to be put in contact with the heads of the rivets $q$, which attach the metal pieces $f\,f$, so as to make this contact more or less distant from the extremity, and thus obtain the current from a greater or less number of elements. Into the hook $p$, at the extremity of the rail $c$, is secured the connecting-wire, while the other connecting-wire is attached to the slide $g'$.

It is evident that the farther the sliding tube $g'$ is pushed to the left-hand side the smaller will be the number of elements brought into the electric circuit, while the contrary will take place when the tube is pushed in the opposite direction. It will be seen, also, that on the same plan the rail $c'$ can be brought in connection with the slide to bring into action all or only a portion of the elements, when set to produce a current of volume, by having metallic projections from the rail $c'$ passing through the horn rail or plate $a^2$, so that the sliding tube $g'$ can be put in contact with any one of them.

For putting this battery into operation a sufficient quantity of salt solution, vinegar, or any other diluted acid is poured into the box; the lid being then shut the elements are moistened, after which, the lid being lifted up and kept in this position by a proper stay or catch, the apparatus is ready for use.

In order to prevent any hydroscopic action of the wooden parts, which would destroy in a great measure their insulating quality, these parts are boiled in oil of turpentine and afterward in linseed-oil, in which latter they are left for cooling.

I do not claim simply making galvanic elements of negative and positive metals, with porous non-conducting substance interposed, as in the well-known galvanic pile.

What I do claim as my invention, and desire to secure by Letters Patent, is—

1. Constructing galvanic elements of positive and negative metals separated from each other by a porous non-conducting substance, when the said porous non-conducting substance is surrounded and held by one or both the said metals, substantially as specified, and for the purpose specified.

2. Forming the galvanic elements by coiling, in the form of helices, the positive and negative wires in grooves previously made in the surface of an inner core of wood or other porous substance, substantially as specified, so that when the wires are wrapped around in the said grooves they shall both be in contact with the porous substance within and separate from each other, as specified.

3. Forming a chain of a series of elements, substantially such as herein described, by means of ties or links, substantially as and for the purpose specified.

4. The method of interrupting the current of electricity by means of the spring-vibrating conductor interposed, substantially as herein described, for the purpose of breaking and closing the circuit by the movement of the human body or other like motion, as set forth.

ISAAC LEWIS PULVERMACHER.

Witnesses:
  DAVID KUNST,
    *Of New York.*
  BERNARD HELLMANN,
    *7 R. de l' Échiquier, Paris.*